United States Patent [19]
Yamaguchi

[11] Patent Number: 4,651,221
[45] Date of Patent: Mar. 17, 1987

[54] FACSIMILE TRANSMISSION SYSTEM
[75] Inventor: Shingo Yamaguchi, Tokyo, Japan
[73] Assignee: Ricoh Company, Ltd., Tokyo, Japan
[21] Appl. No.: 67,636
[22] Filed: Aug. 17, 1979
[30] Foreign Application Priority Data
Aug. 29, 1978 [JP] Japan .................................. 53-104366
[51] Int. Cl.$^4$ ................................................ H04N 1/40
[52] U.S. Cl. ...................................... 358/260; 358/294
[58] Field of Search ......................... 358/260, 261, 294
[56] References Cited
U.S. PATENT DOCUMENTS
3,622,695 11/1971 Rugaber ............................... 358/260
3,893,079 7/1975 Shepard et al. ...................... 358/260
4,156,880 5/1979 Yamada ............................... 358/261

Primary Examiner—Joseph A. Orsino, Jr.
Attorney, Agent, or Firm—David G. Alexander

[57] ABSTRACT

A charge coupled device (CCD) photosensor array (32) continuously performs horizontal scan and feeds out data signals representing horizontal scan lines in such a manner that data signals representing one horizontal scan line are produced during one horizontal scan pulse and fed out during the next horizontal scan pulse. A buffer memory (33) stores at least two scan lines in such a manner that one scan line may be read out for compression while another scan line is being stored. A buffer ready signal is produced when there is sufficient vacant space in the buffer memory (33) to store one scan line and vertical scan is effected in response thereto. The buffer memory (33) is controlled to store only data signals produced during vertical scan to maintain the line scan density constant.

3 Claims, 13 Drawing Figures

FACSIMILE TRANSMISSION SYSTEM

BACKGROUND OF THE INVENTION

The present invention relates to a facsimile transmission process and apparatus utilizing data compression and buffer memory means.

A facsimile apparatus to which the present invention relates comprises a scanner having a charge coupled device (CCD) photosensor array. The array is continuously scanned to produce data signals representing scan lines which are fed to a buffer memory for temporary storage. The operation is such that the array is scanned in response to one horizontal scan pulse and the resulting data signals shifted out of the array to the buffer memory in response to a next horizontal scan pulse.

A compression unit typically performing run length compression reads the data out of the buffer memory and compresses the data to increase the transmission speed. The compression speed varies in accordance with the amount of actual information in the data. For example, if a scan line consists of entirely blank data, the compression time will be very short. However, if the scan line represents a complex pattern, the compression time will be long. For this reason, the buffer memory is provided to store at least two horizontal scan lines in such a manner that one line may be read out for compression while another scan line is being stored from the scanner.

In a CCD array the scan rate must be kept constant in order to prevent a variation in the integration time of internal capacitors which would produce erroneous data. Thus, the buffer memory is operated in a demand manner. More specifically, data is read out of the buffer memory upon demand from the compressor in accordance with the instantaneous compression rate. When enough vacant space becomes available in the buffer memory to store one scan line, a scan line from the scanner is stored in the buffer memory and a vertical scan or incrementation operation is performed. Where the compression rate is low, data will not be stored in the buffer memory in response to each horizontal scan and some horizontal scans will be skipped. For this reason, a vertical scan operation is performed only when a line of data is to be stored in the buffer memory.

When the compression rate is low and a previous horizontal scan has been skipped, the next line of data stored in the buffer memory will correspond to a horizontal scan performed while a vertical scan was not being performed, or while the array was stationary relative to an original document. Thus, the area of the document represented by the horizontal scan will be narrow.

On the contrary, when the compression rate is high and no scan lines are skipped, vertical scan will be performed continuously. Thus, the area of the document represented by each horizontal scan will be wider.

In an apparatus of the present type, a light image of a linear portion of the original document is focussed onto the photosensor array. In such an array, light incident on photosensor elements of the array causes accumulation of charge in proportion to incident light intensity and time. The output signals of the elements correspond to the accumulated charge. The array also comprises an analog shift register into which the output signals of the elements are transferred in parallel. Horizontal clock pulses cause the signals to be serially fed out of the shift register.

This operation constitutes a horizontal scan of the light image of the document. During the horizontal scan the document is moved by one increment perpendicular to the array to effect vertical scan.

While the basic prior art apparatus of this type is generally feasible in practical application, a certain amount of distortion is encountered when the apparatus is employed in conjunction with a data compression unit such as a run lenth encoder. Such a compression unit operates at variable speed which depends on the original document. Where the document contains a large proportion of dark areas, the compression process is relatively slow. For this reason, it is often necessary to interrupt scanning to prevent the data fed from the array into the compression unit or encoder from exceeding the capacity of the encoder.

When the array is controlled by the encoder to begin or resume scanning, the array is scanned simultaneously with moving the document for vertical scan. As a result, the area convered in the vertical direction by each photosensor element for the current scan line corresponds only to the area of the photosensor element. This differs greatly from continuous scanning where the area covered in the vertical direction by each element corresponds to the product of the width of the element in the horizontal direction and the distance the document is moved relative to the array plus the area of the element. This is because when scanning is begun the output signals of the elements are immediately transferred to the shift register and thereafter fed out. The document is at rest when the transfer is made. Thus, not only is the accumulated charge different from that in continuous scan but image areas between scan lines are not scanned.

A typical prior art expedient to overcome this problem is disclosed in U.S. Pat. No. 4,081,843 in which each horizontal scan operation is performed while the document is stationary relative to the array. Although distortion is eliminated to the extent that the scan line density is maintained constant, the problem is not satisfactorily overcome since the scanning speed is limited by the necessity to stop the vertical scan between each two scan lines and the fact that information between adjacent vertical scan lines is lost.

Another method of overcoming this problem is disclosed in copending U.S. patent application Ser. No. 906,107, filed May 15, 1978 now U.S. Pat. No. 4,217,611 which is assigned to the same assignee as the present application. In accordance with this prior method, delay means delay horizontal scanning relative to incrementation movement of the document for vertical scan to ensure that all scanning is performed after the document has moved. Thus, the charge accumulated from scanning all lines is similar regardless of whether the scanning is performed continuously or resumed after a temporary interruption necessitated by a full condition of a buffer memory. The present invention constitutes a significant improvement over the prior method in that it eliminates the necessity to delay the horizontal scan and the delay means required to perform said function while maintaining the vertical scan line density constant.

SUMMARY OF THE INVENTION

A facsimile transmission apparatus embodying the present invention includes a scanner, horizontal scan pulse generator means for generating horizontal scan pulses, the scanner continuously performing horizontal scan and feeding out data signals representing horizontal scan lines in response to the horizontal scan pulses in such a manner that data signals representing a horizontal scan line are produced during a horizontal scan pulse and fed out during a next horizontal scan pulse, buffer memory means for storing data signals representing at least two scan lines during respective horizontal scan pulses, compressor means for reading data signals from the buffer memory means and compressing the data signals and vertical scan means for performing vertical scan, the buffer memory means producing a buffer ready signal when capable of storing data signals representing a horizontal scan line, the vertical scan means performing vertical scan in response to the buffer ready signal, and is characterized by comprising control means for controlling the buffer memory means to store only data signals produced by the scanner while the vertical scan means was performing vertical scan.

In accordance with the present invention, a charge coupled device (CCD) photosensor array continuously performs horizontal scan and feeds out data signals representing horizontal scan lines in such a manner that data signals representing one horizontal scan line are produced during one horizontal scan pulse and fed out during the next horizontal scan pulse. A buffer memory stores at least two scan lines in such a manner that one scan line may be read out for compression while another scan line is being stored. A buffer ready signal is produced when there is sufficient vacant space in the buffer memory to store one scan line and vertical scan is effected in response thereto. The buffer memory is controlled to store only data signals produced during vertical scan to maintain the line scan density constant.

It is an object of the present invention to provide a facsimile transmission process and apparatus which prevents loss of image information when operated in an intermittent manner under the control of a run length encoder or the like.

It is another object of the present invention to provide a facsimile transmission process and apparatus which prevents distortion when operated in an intermittent manner.

It is another object of the present invention to provide a facsimile transmission process and apparatus which ensures constant vertical line scan density in combination with high speed operation.

It is another object of the present invention to provide a generally improved facsimile transmission process and apparatus.

Other objects, together with the foregoing, are attained in the embodiment described in the following description and illustrated in the accompanying drawing.

DESCRIPTION OF THE PREFERRED EMBODIMENT

While the facsimile transmission apparatus of the present invention is susceptible of numerous physical embodiments, depending upon the environment and requirements of use, substantial numbers of the herein shown and described embodiment have been made, tested and used, and all have performed in an eminently satisfactory manner.

Figure 1:
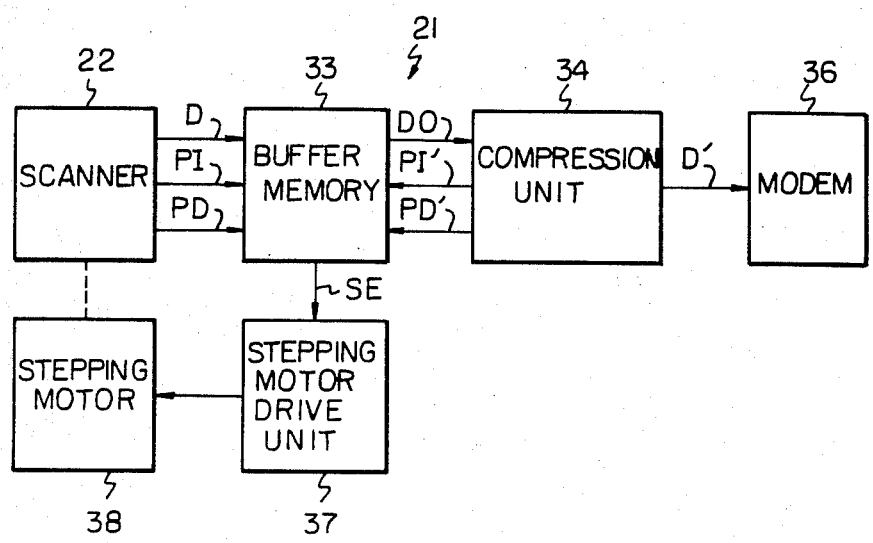
FIG. 1 is a block diagram of a facsimile transmission apparatus embodying the present invention.
Figure 2:
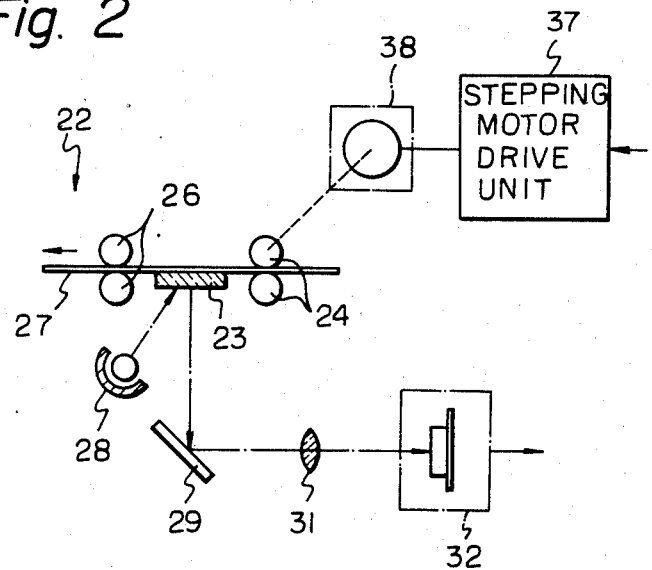
FIG. 2 is a schematic diagram of a scanning means of the apparatus.

Referring now to FIGS. 1 and 2 of the drawing, a facsimile transmission apparatus embodying the present invention is generally designated by the reference numeral 21 and comprises a scanner 22. The scanner 22 includes a transparent glass platen 23 and feed rollers 24 and 26 for feeding an original document 27 over the platen 23 face down. A light source 28 illuminates a linear portion of the document 27 which extends perpendicular to the plane of the drawing. A light image of the linear portion is reflected from a mirror 29 and focussed by a lens 31 onto a linear photosensor array 32. As will be described in detail below, the array 32 is of the charge accumulation type such as a charge coupled device (CCD) array.

The array 32 continuously performs horizontal scan (perpendicular to the plane of the drawing) in response to horizontal scan pulses PI in such a manner that data signals D produced during one horizontal scan pulse PI are fed to a buffer memory 33 during a next horizontal scan pulse PI in synchronism with write or store clock pulses PD. The buffer 33 is capable of storing at least two horizontal scan lines of data signals D.

The data signals are read out of the buffer memory 33 and designated as output signals DO in such a manner that one scan line is read out of the buffer memory 33 in response to one read request pulse PI' in synchronism with read clock pulses PD' and fed to a compression unit 34. The compression unit 34 typically performs run length encoding on the data signals DO to compress the data and thereby increase the transmission speed. The compressed or encoded data signals are designated as D' and are fed to a modem 36 for modulation and transmission to a remote facsimile receiver (not shown).

The buffer memory 33 is constructed in such a manner that data signals DO may be read out of the buffer memory 33 while other data signals D are being written into the buffer memory 33. When there is sufficient vacant space in the memory 33 to store an entire horizontal scan line, the buffer memory 33 produces a vertical scan enable signal SE which is fed to a stepping motor drive unit 37. In response, the drive unit 38 energizes a stepping motor 38 to rotate the rollers 24 and 26 by a sufficient amount to move the document 27 by one vertical scan increment. It will thus be understood that horizontal scan is performed by the array 32 whereas vertical scan is performed by moving the document 27 relative to the array 32. The terminology used herein should not be construed as limiting the scope of the invention since equivalent results may be obtained by utilizing the array 32 to perform vertical scan and moving the document 27 for horizontal scan.

Figure 3:
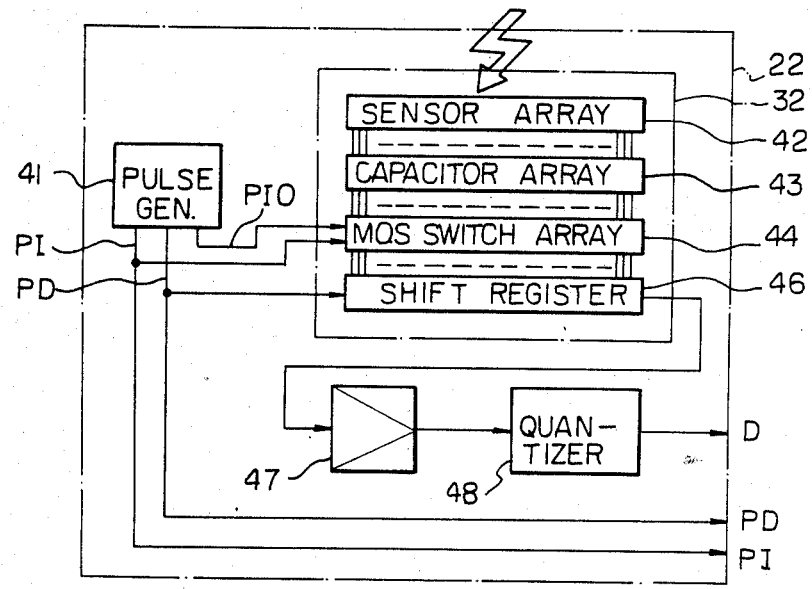
FIG. 3 is a block diagram of a CCD photosensor array of the apparatus.

Referring now to FIG. 3, it will be seen that the scanner 22 comprises a pulse generator 41 which generates the horizontal scan pulses PI, write clock pulses PD and also clear pulses PIO. The array 32 comprises a sensor array 42, capacitor array 43, MOS switch array 44 and CCD analog shift register 46. The output of the shift register 46 is fed through an amplifier 47 to a quantizer 48 which produces the data signals D in binary form.

Figure 4:
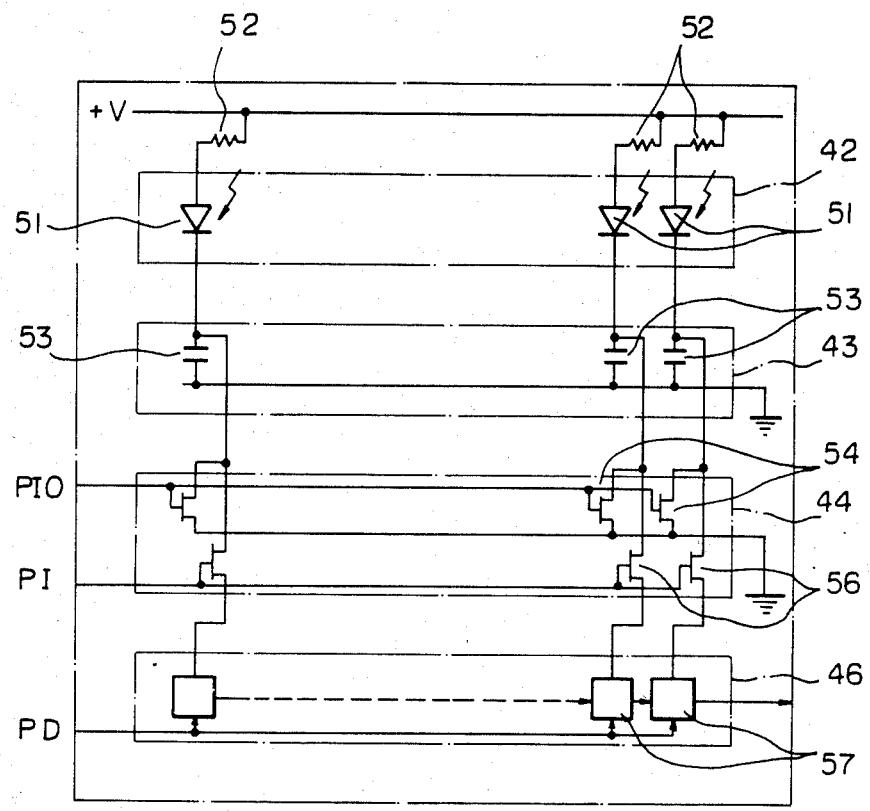
FIG. 4 is a simplified electrical schematic diagram of the photosensor array.

As illustrated in FIG. 4, the sensor array 42 comprises a plurality of photodiodes 51 arranged in a line, the anodes of the photodiodes 51 being connected through resistors 52 to a positive D.C. source +V. The capacitor array 43 comprises a plurality of capacitors 53, the cathodes of the photodiodes 51 being connected to ground through the capacitors 53 respectively.

The junctions of the photodiodes 51 and capacitors 53 are connected to the sources of MOS field effect transistors 54 and 56 respectively of the switch array 44. The drains of the transistors 54 are grounded. The gates of the transistors 54 are connected to receive the clear pulses PIO. The gates of the transistors 56 are connected to receive the horizontal scan signals PI. The drains of the transistors 56 are connected to inputs of elements 57 of the CCD shift register 46. The outputs of the elements 57 are connected in cascade, with the output of the last element 57 constituting the output of the array 46. Shift inputs of the elements 57 are connected to receive the write clock pulses PD.

Figure 5:
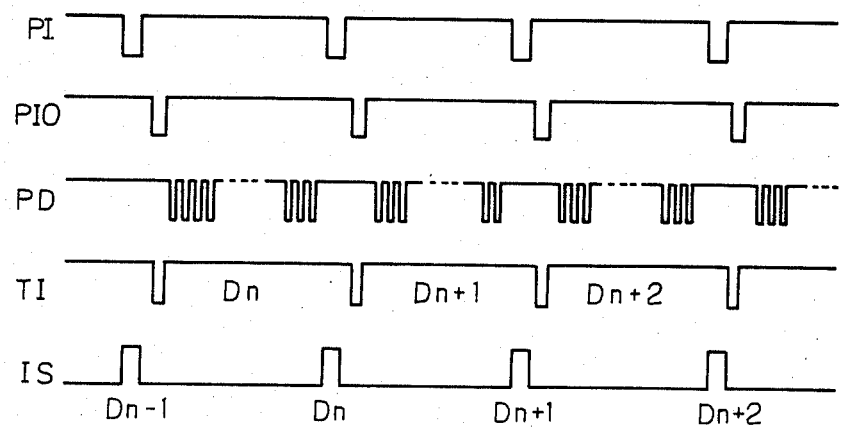
FIGS. 5 and 6 are timing diagrams illustrating principles of the apparatus.

The basic operation of the array 32 is illustrated in FIG. 5. The clear pulse PIO, when logically low, turns on the transistors 54 which short out the capacitors 53 to ground and dissipate any charge thereacross. When the clear pulse PIO goes high, the capacitors 53 begin to charge through the resistors 52 and photodiodes 51 in accordance with the intensity of light incident on the individual photodiodes 51. The greater the amount of incident light, the lower the resistance of the photodiodes 51 and the higher the charging current therethrough.

When the horizontal scan pulse PI goes logically low, it turns on the transistors 56 and connects the junctions of the capacitors 53 and photodiodes 51 to the inputs of the elements 57 of the CCD shift register 46. This causes the voltages across the capacitors 53 to be transferred into the elements 57 respectively. The data transfer into the shift register 46 is indicated at TS and ends when the horizontal scan pulse PI again goes high. This operation is followed by another clear pulse PIO which shorts out the capacitors 53 in preparation for another horizontal scanning operation. The capacitors 53 function to integrate the intensity of incident light with respect to time. The integration time is indicated at TI and is constant, corresponding to the times between consecutive clear pulses PIO.

During the time while the horizontal scan pulse PI is logically high, the transistors 56 are turned off and the data signals which were transferred from the capacitors 53 into the elements 57 during the previous horizontal scan pulse PI are shifted out of the shift register 46 to the quantizer 48 in synchronism with the write clock pulses PD. This operation is illustrated in FIG. 5 for data signals Dn to Dn+2.

In summary, horizontal scan is performed in a parallel manner during a horizontal scan pulse PI. When the pulse PI goes logically low, the data signals corresponding to one horizontal scan line are shifted in parallel into the shift register 46. Then, the capacitors 53 are shorted out to begin the next horizontal scan operation. During the next horizontal scan pulse PI, the data signals which were produced and shifted into the shift register 46 in parallel during the previous horizontal scan pulse PI are shifted out of the shift register 46 in series. Thus, the data signals representing a scan line are produced by a horizontal scan operation during one horizontal scan pulse and fed out of the array 32 during the next horizontal scan pulse.

Figure 6:
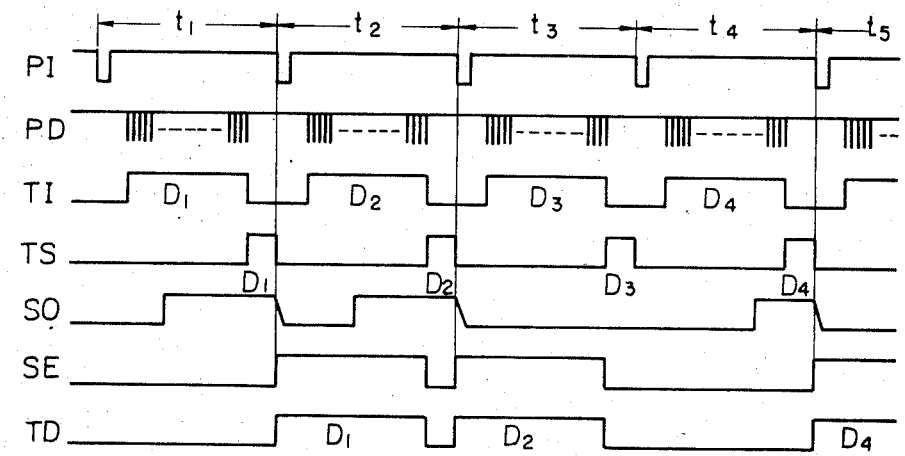
Figure 7:
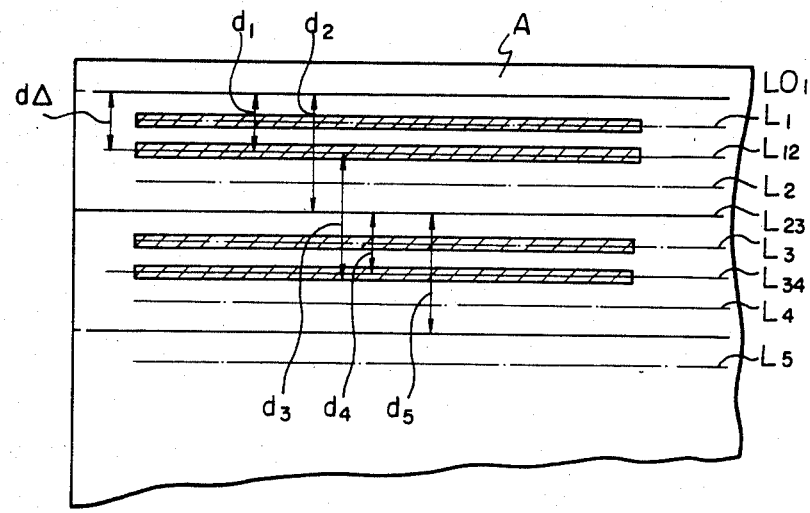
FIG. 7 is a diagram illustrating vertical scan density.

FIGS. 6 and 7 illustrate how the apparatus described thus far is operated in accordance with the prior art and the drawbacks which are inherent in such operation. The array 32 is operated continuously for horizontal scan in response to the horizontal scan pulses PI as described above. Data signals representing horizontal scan lines D1 to D4 are produced during time periods t1 to t4 in response to horizontal scan pulses PI. The scan lines D1 to D4 are fed out of the array 32 during time periods t2 to t5 respectively.

It will be assumed that the data compression by the unit 34 is slow and that there has been insufficient vacant space in the buffer memory 33 prior to the time period t1 to store a line of data. Thus, the motor 38 is not energized and vertical scan is not being performed. Thus, during the time period t1 the document 27 is stationary. It will be further assumed that, during the time period t1, sufficient space becomes vacant in the buffer memory 33 to store a line of data and the buffer 33 produces a buffer ready signal SO. In response to the trailing edge of the first horizontal scan pulse PI and the buffer ready signal SO in coincidence, the buffer memory 33 produces a vertical scan enable signal SE which causes the motor 38 to begin vertical scan. Meanwhile, the scan line D1 is stored in the memory 33.

Assuming that the compression speed is temporarily high, the buffer ready signal SO will again appear during the time period t2. Thus, vertical scan will continue during the time period t3 during which the array 32 produces a scan line D3 while the scan line D2 is stored or written in the memory 33.

If the buffer 33 again becomes full due to a temporarily low compression speed, the buffer ready signal SO will not appear during the time period t3 and vertical scan will not be performed during the time period t4. If the buffer 33 again has a vacant space during the time period t4, the signal SO will be produced and vertical scan will resume during the time period t5. Indicated at TD is the writing or storing of data in the buffer 33. It will be seen that the scan line D1, D2 and D4 are written into the buffer 33 during the time periods t2, t3 and t5 respectively and that the scan line D3 is skipped. In other words, even though the scan line D3 was produced by the array 32 it is not stored in the memory 33 due to the temporary full condition of the memory 33 during the time period t4.

The drawback of the prior art operation of FIG. 6 is illustrated in FIG. 7. It will be understood that the document 27 was stationary (vertical scan was not being performed) while the scan lines D1 and D4 were produced whereas the document 27 was in motion (vertical scan was being performed) while the scan line D2 was being produced. Designated as dΔ is the vertical width of a horizontal scan line shen the document 27 is stationary relative to the array 32. It will be seen that the scan lines D1 and D4 have width d1 and d4 equal to dΔ. The centers of the scan lines are indicated at L1 to L5 whereas spaces between the scan lines L1 to L5 are indicated at L12 to L34 respectively.

It will be seen that the width d1 of the scan line D1 is dΔ and extends from a line L01 above the line L1 to the line L12. The width d4 of the scan line D4 is also dΔ and extends from the line L23 to the line L34. However, since the document 27 was in motion (vertical scan was being performed) while the scan line D2 was being produced, the width d3 of the scan line D3 extends from L01 to L23 and is equal to 2dΔ. It is also noteworthy that the scan line D2 overlaps the scan line D1. The width of a scan line means the vertical dimention which is scanned.

It will be seen that not only is the vertical line scan density unequal in cases when the document 27 was stationary or in motion while horizontal scanning was being performed but the scan lines overlap in an irregular manner. This produces highly distorted facsimile reproduction.

Figure 8:
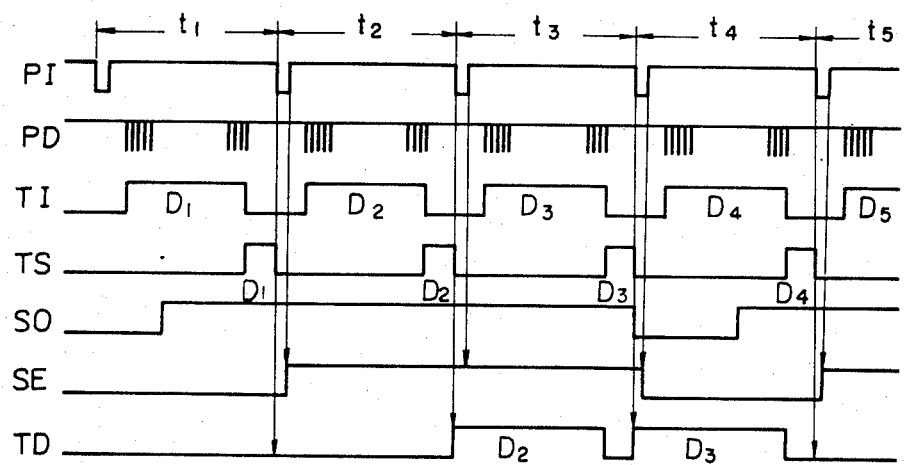
FIG. 8 is a timing diagram illustrating the operation of the apparatus.

This drawback is overcome in accordance with the present invention as illustrated in FIG. 8. The status of the buffer memory 33 is the same as in FIG. 6 such that the buffer 33 has a vacancy during the time period t1. The scan enable signal SE is produced during the time period t2 to start vertical scan. Thus, vertical scan is performed during the time periods t2 and t3. The memory 33 again becomes full during the time period t4 and vertical scan is interrupted during the time period t4 but resumed during the time period t5.

The feature of the present invention is that the scan lines D2, D3 and D5 are stored in the memory 33 rather than the scan lines D1, D2 and D4. Each of the scan lines D2, D3 and D5 is produced while the document 27 is in motion, or while vertical scan is being performed. Each scan line D2, D3 and D5 has a width equal to 2dΔ, and adjacent scan lines D2, D3 and D5 which are stored in the memory 33 overlap by a width dΔ in a regular manner. Thus, information between adjacent scan lines is not lost and there is no distortion. The principle of the present invention is therefore to store only those data lines for compression which were produced during vertical scan. The means for embodying this principle will be well understood from the following description of the buffer memory 33.

Figure 9:
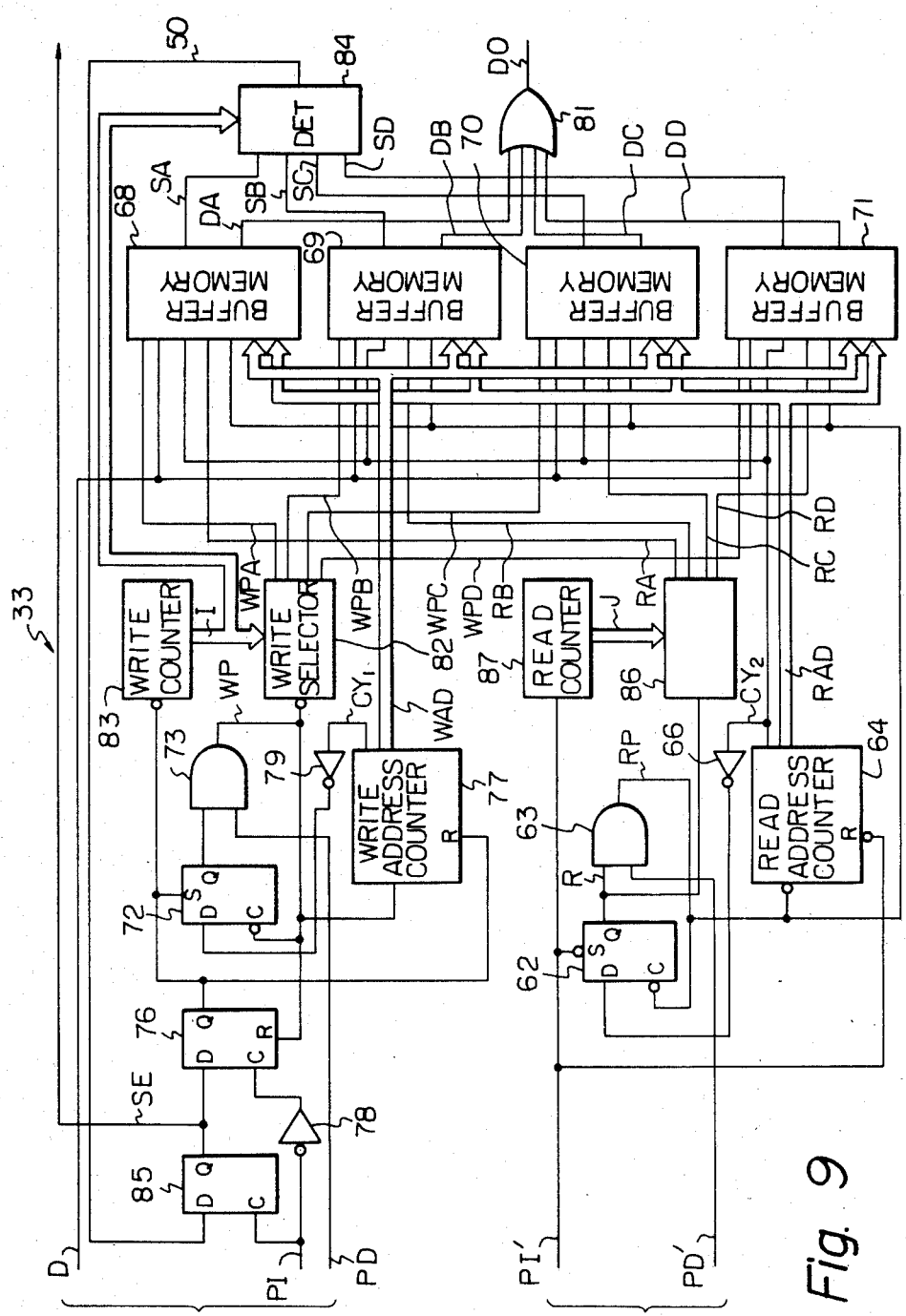
FIG. 9 is a schematic diagram of a buffer memory unit of the apparatus.

The memory 33 is shown in FIG. 9 as comprising a read enable flip-flop 62, the read request signal PI' being applied to a set input of the flip-flop 62. The Q output of the flip-flop 62 constitutes a read enable signal R and is connected to an input of an AND gate 63. The output of the AND gate 63 is connected to a clock input of the flip-flop 62 and to a count input of a read address counter 64. A carry output of the counter 64 is designated as CY2 and connected to a D input of the flip-flop 62 through an inverter 66. The output of the flip-flop 63 is also connected to buffer memories 68, 69, 70 and 71.

The buffer 33 further comprises a write or store enable flip-flop 72 which has a Q output connected to an input of an AND gate 73. The output of the AND gate 73 is connected to a clock input of the flip-flop 72 and also to a reset input of a write or store start flip-flop 76. The Q output of the flip-flop 76 is connected to a reset input of a write address counter 77, the output of which constitutes a write address WAD and is connected to the memories 68, 69, 70 and 71. The output of the AND gate 73 is connected to a count input of the counter 77. The horizontal scan pulse PI is applied to a clock input of the flip-flop 76 through an inverter 78. A carry output CY1 of the counter 77 is connected through an inverter 79 to a D input of the flip-flop 72.

The Q output of the flip-flop 76 is also connected to a set input of the flip-flop 72 and to an input of a write counter 83, the output of which is designated as I and connected to an input of a write selector 82 as well as to an input of a detector 84. The write selector 82 produces outputs WPA, WPB, WPC and WPD which are connected to the memories 68, 69, 70 and 71 respectively. Outputs SA, SB, SC and SD of the memories 68, 69, 70 and 71 are connected to inputs of the detector 84. The detector 84 produces at its output the buffer ready signal SO which is applied to a D input of a vertical scan enable flip-flop 85. The memories 68, 69, 70 and 71 produce data outputs DA, DB, DC and DD which are applied to inputs of an OR gate 81. The output DO of the buffer 33 appears at the output of the OR gate 81.

The Q output of the flip-flop 85 constitutes the vertical scan enable signal SE and is applied to a D input of the flip-flop 76 as well as to the drive unit 37. The horizontal scan pulse PI is applied to a clock input of the flip-flop 85. The write clock pulses PD are applied to an input of the AND gate 73.

The read clock pulses PD' are fed to an input of the AND gate 63. The read request pulse PI' is applied to a reset input of the read address counter 64 as well as to an input of a read counter 87. The output of the read counter 64 is a read address RAD which is connected to the memories 68, 69, 70 and 71. The output of the read counter 87 is designated as J and is connected to an input of a read selector 86. The output of the flip-flop 62 is connected to another input of the selector 86. The read selector 86 produces outputs RA, RB, RC and RD which are connected to the memories 68, 69, 70 and 71 respectively. The carry signal CY2 from the read address counter 64 is connected to the memories 68, 69, 70 and 71. The data signals D are also applied to the memories 68, 69, 70 and 71 from the scanner 22.

Figure 10:
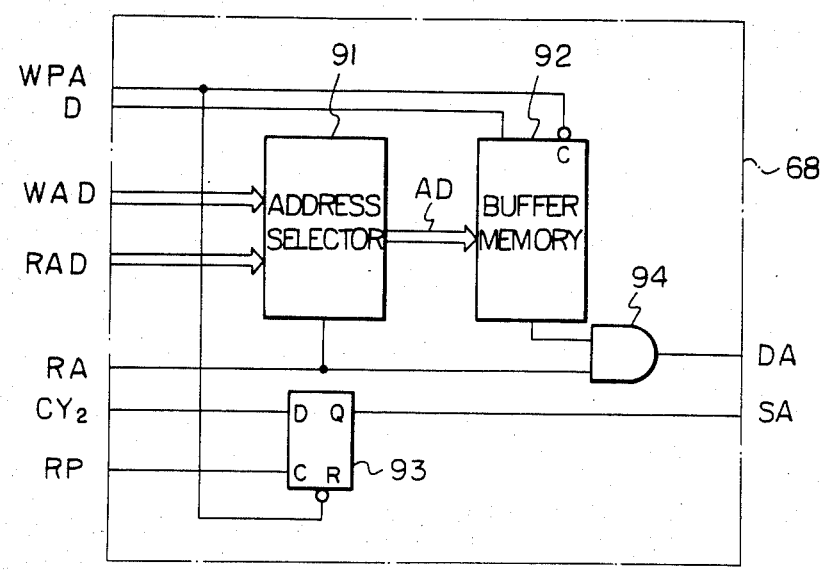
FIG. 10 is a schematic diagram of a buffer memory of the buffer memory unit.

The memories 68, 69, 70 and 71 are identical, with the memory 68 being shown in detail in FIG. 10. The memory 68 comprises an address selector 91 which receives at its inputs the write address WAD and the read address RAD. When a read enable signal RA is logically high, the selector 91 passes the read address RAD as an address AD to a buffer memory 92 in the form of a random access memory. When the read enable signal RA is logically low, the selector 91 passes the write address WAD to the memory 92. Write pulses WPA from the selector 82 are fed to a clock input of the memory 92 and to a reset input of a flip-flop 93. The output of the memory 92 is connected to an input of an AND gate 94, the output of which constitutes the data signals DA. The read enable signal is also applied to a select input of the selector 91 and to another input of the AND gate 94.

The carry pulse CY2 from the counter 64 is applied to a D input of the flip-flop 93. Read pulses RP from the AND gate 63 are applied to a clock input of the flip-flop 93. The signal SA appears at the Q output of the flip-flop 93.

Figure 11:
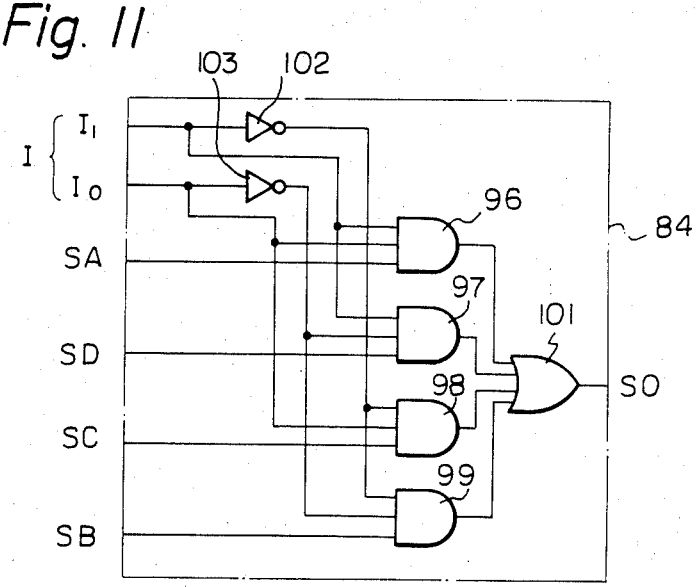
FIG. 11 is a schematic diagram of a detector unit of the buffer memory unit.

The detector 84 is shown in FIG. 11 as comprising four AND gates 96, 97, 98 and 99 having outputs connected to inputs of an OR gate 101. The buffer ready signal SO appears at the output of the OR gate 101. The signals SA, SB, SC and SD from the memories 68, 69, 70 and 71 are applied to inputs of the AND gates 96, 99, 98 and 97 respectively.

The write counter 83 is a modulo-4 counter as is the read counter 87. The output I of the counter 83 corresponds to the count and comprises a high order bit I1 and a low order bit I0. The high order bit I1 is connected directly to inputs of the AND gates 96 and 97 and through an inverter 102 to inputs of the AND gates 98 and 99. The low order bit I0 is connected directly to inputs of the AND gates 96 and 98 and through an inverter 103 to inputs of the AND gates 97 and 99.

Figure 12:
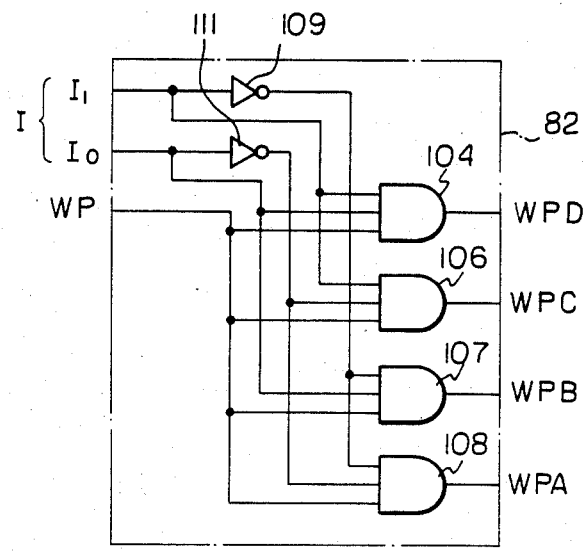
FIG. 12 is a schematic diagram of a write or store pulse selector unit of the buffer memory unit.

The write selector 82 is illustrated in FIG. 12. The read selector 86 has an essentially similar construction and is not illustrated. The write selector 82 comprises AND gates 104, 106, 107 and 108 which produce at their outputs the signals WPD, WPC, WPB and WPA respectively. The signal WP from the AND gate 63 is applied to inputs of all of the AND gates 104, 106, 107 and 108. The high order bit I1 is connected directly to inputs of the AND gates 104 and 106 and through an inverter 109 to inputs of the AND gates 107 and 108. The low order bit I0 is connected directly to inputs of the AND gates 104 and 107 and through an inverter 111 to inputs of the AND gates 106 and 108.

Figure 13:
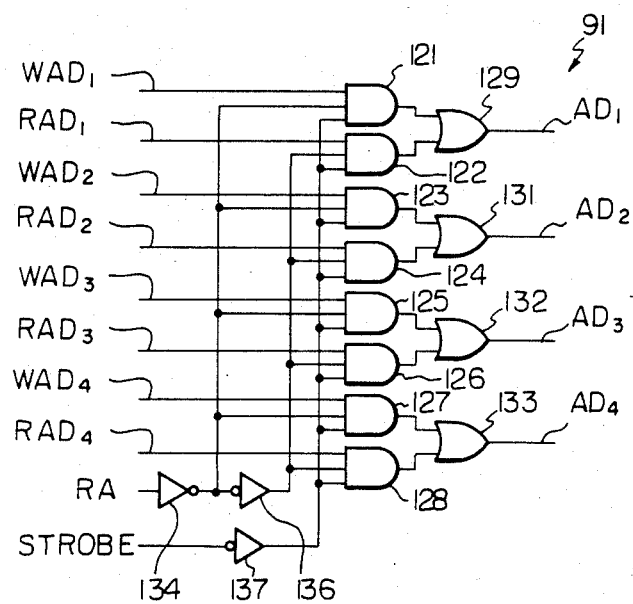
FIG. 13 is a schematic diagram of an address selector unit of the buffer memory.

The address selector 91 shown in FIG. 13 may be constituted by a TTL intergrated chip type 74157 designated as "Quadruple 2-line-to-1-line Data Selectors/Multiplexers" as illustrated. The selector 91 comprises AND gates 121, 122, 123, 124, 125, 126, 127 and 128. The outputs of the AND gates 121 and 122 are connected to inputs of an OR gate 129. The outputs of the AND gates 123 and 124 are connected to inputs of an OR gate 131. The outputs of the AND gates 125 and 126 are connected to inputs of an OR gate 132. The outputs of the AND gates 127 and 128 are connected to inputs of an OR gate 133.

The read enable signal RA is applied to the input of an inverter 134 which constitutes a select input of an inverter 134 which constitutes a select input of the selector 91. The output of the inverter 134 is connected to inputs of the AND gates 121, 123, 125 and 127 and also to an input of an inverter 136. The output of the inverter 136 is connected to inputs of the AND gates 122, 124, 126 and 128. Strobe pulses are applied to inputs of all of the AND gates 121 to 128 through an inverter 137.

The write address WAD consists of four bits WAD1, WAD2, WAD3 and WAD4 which are applied to inputs of the AND gates 121, 123, 125 and 127 respectively. The read address RAD consists of four bits RAD1, RAD2, RAD3 and RAD4 which are applied to inputs of the AND gates 122, 124, 126 and 128 respectively. The output address AD consists of four bits AD1, AD2, AD3 and AD4 which appear at the outputs of the OR gates 129, 131, 132 and 133 respectively. The strobe input to the inverter 137 may be grounded to enable the selector 91 to operate all the time.

The read or output operation of the buffer 33 is as follows, assuming that a horizontal scan line has been stored in at least the memory 68.

The flip-flop 62 is initially reset and the counts in the counters 87 and 64 are maximum. The count in the counter 87 is four. In response to a read request pulse PI', the flip-flop 62 is set and the counter 64 is reset to zero. The read counter 87 is incremented to the count of zero.

The high Q output of the flip-flop 62, which constitutes the read enable signal R, enables the AND gate 63 so that the read clock pulses PD' are gated therethrough as the read clock pulses RP. The read clock pulses RP are applied to the read address counter 64 and to the memories 68, 69, 70 and 71.

Since the count in the counter 87 is zero, the selector 86 gates the read enable signal R therethrough only to the memory 68 as the read enable signal RA. This has the effect of selecting the memory 68 for read operation. The clock pulses RP increment the counter 64 to sequentially address higher numbered memory locations in the memory 68 and read out the data signals in said memory locations. The data signals read out of the memory 68 are the signals DA which are gated through the OR gate 81 as the signals DO.

As the last data signal is read out of the memory 68, the counter 64 produces the carry signal CY2 which is inverted and applied to the D input of the flip-flop 62 as a logically low signal. The flip-flop 62 is reset by the next read clock pulse RP gated through the AND gate 63 to the clock input of the flip-flop 62 since the D input of the flip-flop 62 is low. The Q output of the flip-flop 62 goes low to inhibit the AND gate 63 and prevent further clock pulses from being gated therethrough. The low Q output of the flip-flop 62 also results in the read enable signal RA going low to inhibit the memory 68 from further read operation. In summary, in response to a read request pulse PI' one scan line of data signals is read out of the memory 68 and the read operation automatically terminated by the carry pulse CY2 after the last data signal is read out.

In response to the next read request pulse PI', one scan line of data signals will be read out of the memory 69. Subsequent scan lines will be read out of the memories 70, 71, 68, etc. in response to respective read request signals PI'. After the first scan line is read out of the memory 68, the second read request pulse PI' will increment the counter 87 to the count of one. This will cause the selector 86 to gate the read enable signal R to the memory 69 as the signal RB. For the third and fourth scan lines, the count in the counter 87 will be increased to three and four and the selector 86 will produce the signals RC and RD to enable the memories 70 and 71 respectively for read operation.

Referring also to FIG. 10, the read enable signal RA causes the address selector 91 to select the read address RAD from the counter 64. The sequentially increasing read address AD causes corresponding addresses in the memory 92 to be selected for read out operation. The high signal RA enables the AND gate 94 so that the data signals DA are gated therethrough to the OR gate 81.

The flip-flop 93 is initially reset so that the signal SA appearing at the Q output there is low. When the carry signal CY2 goes high indicating that the last data signal has been read out of the memory 92, the D input of the flip-flop 93 goes high and the flip-flop 93 is set in response to the next pulse RP appearing at the clock input thereof. The high signal SA is a buffer ready signal for the memory 68 indicating that data has been read out of the memory 92 and the buffer memory 68 is available to store another horizontal scan line of data. In other words, the memory 68 is vacant or available.

The basic operation of writing data into the memories 68, 69, 70 and 71 is quite similar to that of reading data out. When the write or store enable flip-flop 72 is set, the high output thereof enables the AND gate 73 to gate write pulses PD therethrough as write pulses WP to the write selector 82 and write address counter 77. The first write pulse WP resets the flip-flop 76 via the AND gate 73. The address counter 77 is incremented by the write pulses RP to sequentially address higher numbered memory locations in the selected memory 68, 69, 70 or 71 and store data signals therein. The write counter 83 is initially set to the maximum count of four and is incremented to zero in response to the output of the flip-flop 76 going high as will be described below. This also resets the counter 77 to zero.

Referring also to FIG. 12, when the count in the counter 83 is zero the signals I1 and I0 are both low so that only the AND gate 108 is enabled. Thus, the write pulses WP are gated through the AND gate 108 to the memory 68 as the pulses WPA. Incrementation of the counter 83 for subsequent scan lines causes the AND gates 107, 106 and 104 to be enabled to gate the write pulses WP to the memories 69, 70 and 71 as the pulses WPB, WPC and WPD respectively.

The first write pulse WPA resets the flip-flop 93 of the memory 68 so that the signal SA goes low. This indicates that the memory 68 is in use and is not available to store data. This operation will be described in detail below.

Referring also to FIG. 13, in the read mode the read enable signal RA is high and the AND gates 122, 124, 126 and 128 are enabled to gate the read address bits RAD1, RAD2, RAD3 and RAD4 therethrough as the address bits AD1, AD2, AD3 and AD4 respectively to the memory 92. When the read enable signal RA is low during a write operation, the AND gates 121, 123, 125 and 127 are enabled to gate the write address bits WAD1, WAD2, WAD3 and WAD4 therethrough as the address bits AD1, AD2, AD3 and AD4 respectively to the memory 92. The strobe input may be grounded to allow continuous operation. However, the read clock pulses RP or the write clock pulses WPA may be applied to the strobe input of the selector 91 as strobe pulses during read and write operation respectively if desired.

A novel feature of the present invention resides in the read control of the buffer 33 by means of the detector 84 and flip-flops 85, 76 and 72. Referring also to FIG. 11, prior to any write operation the flip-flops 93 in all of the memories 68, 69, 70 and 71 are preset and the counter 83 is preset to the maximum count of four. The bits I1 and I0 of the address signal I are both high and the AND gate 96 in the detector 84 is enabled. Since the flip-flop 93 in the memory 68 is set, the signal SA is high indicating that the memory 68 is ready for storing data. The high signal SA is gated through the AND gate 96 to constitute the buffer ready signal S0.

The buffer ready signal S0 is applied to the D input of the flip-flop 85. The leading edge of the first horizontal scan pulse PI applied to the clock input of the flip-flop 85 causes the flip-flop 85 to be set and produce a high Q output which constitutes the scan enable signal SE. The scan enable signal SE causes the scanner 22 to begin vertical scan. However, the Q outputs of the flip-flops 76 and 72 are low so no data writing occurs during the first horizontal scan pulse PI.

However, the high Q output of the flip-flop 85 is applied to the D input of the write start flip-flop 76. The trailing edge of the first pulse PI is inverted by the inverter 78 and causes the flip-flop 76 to be set.

The high Q output of the flip-flop 76 sets the write enable flip-flop 72, increments the write counter 83 to the count of zero and resets the write address counter 77 to zero. The zero count in the write counter 83 causes the write selector 82 to gate the write pulses WPA to the buffer 68 in the manner described above to store the first horizontal scan line in the memory 68 during the second horizontal scan pulse PI. The count of zero in the counter 83 causes the AND gate 99 in the detector 84 to be enabled. If the signal SB is low indicating that the memory 69 is not available for writing a new scan line therein, the AND gate 99 and thereby the detector 84 will produce a low buffer ready signal S0 which is applied to the D input of the flip-flop 85.

After storing the first line in the memory 68, the carry pulse CY1 causes the flip-flop 72 to be reset in response to the next write pulse WP. Thus, after the last data signal of the first line is stored, both flip-flops 72 and 76 are reset.

Assuming that the buffer ready signal S0 is low indicating that a second scan line can not be stored in the buffer memory 69, the flip-flop 85 will be reset by the leading edge of the second horizontal scan pulse PI. Thus, vertical scan will be stopped and the next scan line from the scanner 22 will not be stored in the buffer 69.

However, if the signal SB is high indicating that the buffer 69 is available for storing another scan line, the buffer ready signal S0 will also be high and the Q output of the flip-flop 85 will remain high in response to the leading edge of the second horizontal scan pulse PI. Thus, vertical scan will continue during the second pulse PI during which time the first line of data is stored in the memory 68. The trailing edge of the second scan pulse PI will set the flip-flop 76 and thereby the flip-flop 72 so that the second scan line fed to the buffer 33 from the scanner 22 during the third horizontal scan pulse PI will be stored in the memory 69.

The function of the detector 84 is to look at the next memory 68, 69, 70 or 71 into which data is to be stored to see if the memory is vacant.

If a line of data previously stored in a memory 68, 69, 70 or 71 has not been completely read out, the corresponding signal SA, SB, SC or SD will be low indicating that the memory is unavailable for storage. In this manner, the write operation chases the read operation and, when the write operation catches the read operation, the write operation is interrupted until the read operation proceeds to the point that the next one of the memories 68, 69, 70 or 71 becomes available for data storage.

The important feature of the present invention resides in the fact that storage of data is only possible if the data was produced during a vertical scan operation. This ensures that the vertical line scan density will always be constant. The store start flip-flop 76 is set in response to the trailing edge of a horizontal scan pulse PI only if the scan enable signal SE is present indicating that vertical scan was performed during said horizontal scan pulse. The status of the flip-flop 85 in response to the leading edge of the next horizontal scan pulse PI depends on whether the next memory 68, 69, 70 or 71 is available for data storage. If the next memory is available, vertical scan will be performed during the next horizontal scan pulse PI and the resulting data signals stored in the buffer 33 during the following scan pulse PI. If the next memory 68, 69, 70 or 71 is not available for data storage, vertical scan will not be performed and the resulting data signals will not be stored in the buffer 33.

In summary, it will be seen that the present invention provides a facsimile transmission process and apparatus which overcome the drawbacks of the prior art and enable facsimile scanning with constant vertical scan line density. Various modifications will become possible for those skilled in the art after receiving the teachings of the present disclosure without departing from the scope thereof. For example, the number of memories in the buffer 33 does not have to be four, but must be at least two.

What is claimed is:

1. A facsimilar transmission apparatus including a scanner, horizontal scan pulse generator means for generating horizontal scan pulses, the scanner continuously performing horizontal scan and feeding out data signals representing horizontal scan lines in response to the horizontal scan pulses in such a manner that data signals representing a horizontal scan line are produced during a horizontal scan pulse and fed out during a next horizontal scan pulse, buffer memory means for storing data signals representing at least two scan lines during respective horizontal scan pulses, compressor means for reading data signals from the buffer memory means and compressing the data signals and vertical scan means for performing vertical scan, the buffer memory means producing a buffer ready signal when capable of storing data signals representing a horizontal scan line, the vertical scan means performing vertical scan in response to the buffer ready signal, characterized by comprising:

control means for controlling the buffer memory means to store only data signals produced by the scanner while the vertical scan means was performing vertical scan;

the control means comprising first means constructed to, in response to the buffer ready signal and a leading edge of a first horizontal scan pulse in coincidence, produce a vertical scan signal causing the vertical scan means to perform vertical scan and second means constructed to, in response to a trailing edge of the first horizontal scan pulse, produce a store signal causing the buffer memory means to store data signals during a second horizontal scan pulse which follows the first horizontal scan pulse.

2. An apparatus as in claim 1, in which the first means comprises a vertical scan flip-flop which is set by the buffer ready signal in coincident with the leading edge of the first horizontal scan pulse, the second means comprising a store start flip-flop which is set by a high output of the vertical scan flip-flop in coincidence with the trailing edge of the first horizontal scan pulse.

3. An apparatus as in claim 1, in which the control means further comprises a store enable flip-flop which is set by a high output of the store start flip-flop in coincidence with the leading edge of the second horizontal scan pulse.

* * * * *